United States Patent
Decrop et al.

(10) Patent No.: US 11,539,540 B1
(45) Date of Patent: Dec. 27, 2022

(54) AMELIORATIVE RESOURCE ACTION DURING AN E-CONFERENCE

(71) Applicant: INTERNATIONAL BUSINESS MACHINES CORPORATION, Armonk, NY (US)

(72) Inventors: Clement Decrop, Arlington, VA (US); Martin G. Keen, Cary, NC (US); John M. Ganci, Jr., Raleigh, NC (US); Zachary A. Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/456,900

(22) Filed: Nov. 30, 2021

(51) Int. Cl.
*H04L 12/18* (2006.01)
*H04L 67/50* (2022.01)

(52) U.S. Cl.
CPC ...... *H04L 12/1827* (2013.01); *H04L 12/1831* (2013.01); *H04L 67/535* (2022.05)

(58) Field of Classification Search
CPC ............. H04L 12/1827; H04L 12/1831; H04L 67/535
See application file for complete search history.

(56) References Cited

U.S. PATENT DOCUMENTS

| | | | |
|---|---|---|---|
| 8,433,813 B2 | 4/2013 | Garcia, Jr. | |
| 8,818,345 B1* | 8/2014 | Shah | H04M 3/561 709/204 |
| 10,171,525 B2* | 1/2019 | Baughman | H04L 65/403 |
| 2002/0064136 A1 | 5/2002 | O'Neil | |
| 2013/0290438 A1* | 10/2013 | Bank | H04L 12/1822 709/206 |
| 2015/0073851 A1* | 3/2015 | Bank | H04L 65/1069 705/7.19 |
| 2016/0210593 A1* | 7/2016 | Bank | G06F 3/0481 |
| 2018/0007101 A1* | 1/2018 | Baughman | G06F 40/40 |

(Continued)

FOREIGN PATENT DOCUMENTS

| | | |
|---|---|---|
| EP | 2050264 B1 | 6/2012 |
| WO | 2015105408 A1 | 7/2015 |

OTHER PUBLICATIONS

Author Unknown, "How to avoid 100% CPU load when screen-sharing through zoom," Makandra cards, Accessed: Aug. 31, 2021, https://makandracards.com/makandra-orga/473077-how-to-avoid-100-cpu-load-when-screen-sharing-through-zoom, 1 page.

(Continued)

*Primary Examiner* — Jonathan A Bui
(74) *Attorney, Agent, or Firm* — Brandon L. Stephens

(57) ABSTRACT

A method, a computer program product, and a system for enacting ameliorative resource action during an e-conference. Exemplary embodiments of the present inventive concept may include a method for enacting ameliorative resource action during an e-conference. The method may include collecting data from a user's computer device during the e-conference. Features may be extracted from the collected e-conference data. A user's participation within the e-conference and a resource consumption thereof may be forecasted by applying a user activity model to the extracted features. The ameliorative resource action may be enacted based upon the forecasted user's participation and the resource consumption thereof.

11 Claims, 5 Drawing Sheets

(56) References Cited

U.S. PATENT DOCUMENTS

2018/0098026 A1    4/2018  Gadnir
2021/0149465 A1    5/2021  Hiltner

OTHER PUBLICATIONS

Author Unknown, "IBM and Cisco Solutions," Cisco, Accessed: Aug. 31, 2021, https://www.cisco.com/c/en/us/solutions/global-partners/ibm.html, 7 pages.
Disclosed Anonymously, "AI-Based System to Optimally Allocate Available Resources," IP.com, IP.com No. IPCOM000263888D, IP.com Publication Date: Oct. 16, 2020, 5 pages.
Mell et al., "The NIST Definition of Cloud Computing", National Institute of Standards and Technology, Special Publication 800-145, Sep. 2011, pp. 1-7.

* cited by examiner

AMELIORATIVE RESOURCE ACTION DURING AN E-CONFERENCE

BACKGROUND

Exemplary embodiments of the present inventive concept relate to e-conferences, and more particularly to enacting ameliorative resource action during an e-conference.

E-conference platforms enable users to present multimedia, chat, and screen share with one another in real-time. However, this real-time streaming can cause high usage of CPU, bandwidth, and cooling resources on a computing device, particularly if that computing device is running other tasks in the background while the e-conference is underway. Frequently experienced issues during an e-conference may include: loud and interfering cooling fan noise due to high CPU utilization, resulting in poor quality audio; poorly responsive screen sharing due to high processing load; and bandwidth bottlenecks that cause a live video stream to exhibit a low resolution and a low frame rate.

In addition, many computer device users work remotely, necessitating the use of Virtual Private Network (VPNs) to secure access within users' networks. However, one challenge with the use of VPNs is how the destination hostname/Internet Protocol (IP) is determined, such as if the Internet Service Provider (ISP) IP address or business network IP is used, or if a VPN tunnel is used. Each VPN option has implications for network performance that can impact the streaming quality of an e-conference.

SUMMARY

Exemplary embodiments of the present inventive concept relate to a method, a computer program product, and a system for ameliorative resource action during an e-conference.

According to an exemplary embodiment of the present inventive concept, a method may be provided for enacting ameliorative resource action during an e-conference. The method may include collecting data from a user's computer device during the e-conference. Features may be extracted from the collected e-conference data. A user's participation within the e-conference and a resource consumption thereof may be forecasted by applying a user activity model to the extracted features. The ameliorative resource action may be enacted based upon the forecasted user's participation and the resource consumption thereof.

According to an exemplary embodiment of the present inventive concept, a computer program product may enact ameliorative resource action during an e-conference. The computer program may include one or more computer-readable storage media and program instructions stored on the one or more computer-readable storage media, the program instructions including a method. The method may be provided for enacting ameliorative resource action during an e-conference. The method may include collecting data from a user's computer device during the e-conference. Features may be extracted from the collected e-conference data. A user's participation within the e-conference and a resource consumption thereof may be forecasted by applying a user activity model to the extracted features. The ameliorative resource action may be enacted based upon the forecasted user's participation and the resource consumption thereof.

According to an exemplary embodiment of the present inventive concept, a computer system may be used to enact ameliorative resource action during an e-conference. The system may include one or more computer processors, one or more computer-readable storage media, and program instructions stored on one or more of the computer-readable storage media for execution by at least one of the one or more processors. The program instructions may include a method. The method may be provided for enacting ameliorative resource action during an e-conference. The method may include collecting data from a user's computer device during the e-conference. Features may be extracted from the collected e-conference data. A user's participation within the e-conference and a resource consumption thereof may be forecasted by applying a user activity model to the extracted features. The ameliorative resource action may be enacted based upon the forecasted user's participation and the resource consumption thereof.

BRIEF DESCRIPTION OF THE DRAWINGS

The following detailed description, given by way of example and not intended to limit the exemplary embodiments solely thereto, will best be appreciated in conjunction with the accompanying drawings, in which.

Figure 1:
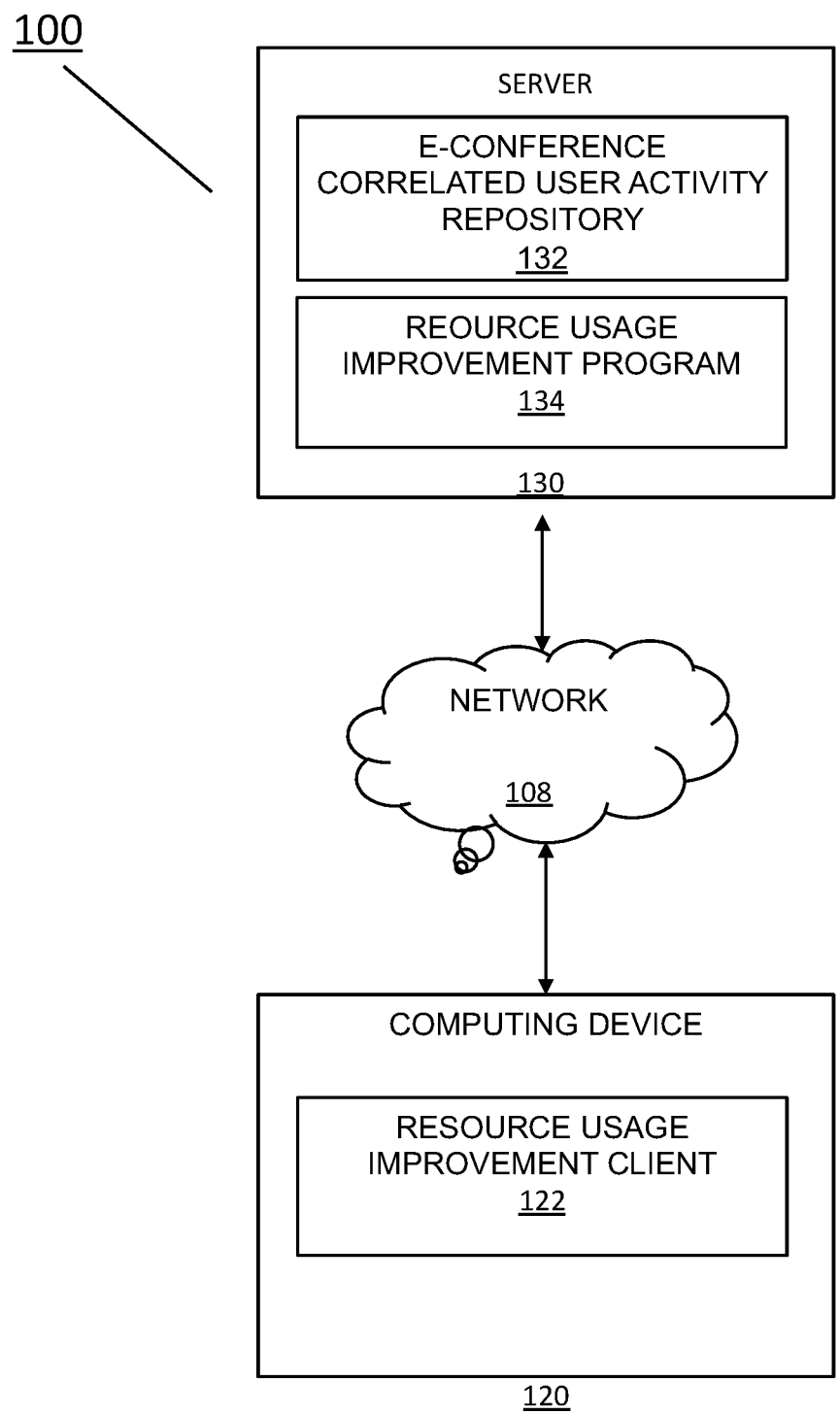
FIG. 1 illustrates a schematic diagram of a resource usage improvement system 100, in accordance with an exemplary embodiment of the present inventive concept.

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION OF THE DRAWINGS

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments of the present inventive concept, in the following detailed description, some processing steps or operations that are known in the art may have been combined together for presentation and for illustration purposes, and in some instances, may have not been described in detail. Additionally, some processing steps or operations that are known in the art may not be described at all. It should be understood that the following detailed description is focused on the distinctive features or elements of the present inventive concept according to various exemplary embodiments.

As referenced above, frequently experienced issues encountered during e-conferences include: high fan noise on a laptop cooling itself due to high CPU utilization, which may be broadcast over the e-conference as the user speaks, resulting in poor quality audio; poorly responsive screen sharing due to high processing load, causing a user's computing device to perform slowly during screen sharing, creating a sub-optimal experience for all e-conference participants; and bandwidth bottlenecks that cause a live video stream to exhibit a low resolution and low frame rate due to a lack of upload bandwidth to the e-conferencing platform. In addition, many users are working remotely nowadays especially due to Covid-19, thus Virtual Private Network (VPNs) are used for secure access to users' business networks. One challenge with the use of VPNs is how the destination hostname/IP is determined, such as if the ISP IP or business network IP is used or if a VPN tunnel should be used. Each VPN option has implications for network performance that can impact the e-conference streaming quality.

Presented hereafter are exemplary embodiments of the present inventive concept capable of addressing the aforementioned encumbrances to streaming quality during an e-conference through ameliorative resource action. The present inventive concept may involve collecting raw data during an e-conference and applying a series of artificial intelligence techniques to the raw data to extract features such as topics. The present inventive concept may involve using these extracted features to forecast user activity and corresponding computing device resource consumption during different portions of an e-conference in order to take ameliorative resource action based thereon.

FIG. 1 depicts a schematic diagram of a resource usage improvement system 100, in accordance with an exemplary embodiment of the present inventive concept.

The resource usage improvement system 100 may include a user operated computing device 120 and a resource usage improvement server 130, which may all be interconnected via a network 108. Programming and data content may be stored and accessed remotely across several servers via the network 108. Alternatively, programming and data may be stored locally on as few as one physical computing device 120 or stored amongst multiple computing devices.

According to the exemplary embodiment of the present inventive concept depicted in FIG. 1, the network 108 may be a communication channel capable of transferring data between connected devices. The network 108 may be the Internet, representing a worldwide collection of networks 108 and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. The network 108 may be a Bluetooth network, a Wi-Fi network, or a combination thereof. The network 108 may operate in frequencies including 2.4 GHz and 5 GHz internet, near-field communication, Z-Wave, Zigbee, etc. The network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

The computing device 120 may include the resource usage improvement client 122, and may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. Although the computing device 120 is shown as a single device, the computing device 120 may be comprised of a cluster or plurality of computing devices, in a modular manner, etc., working together or working independently.

Figure 3:
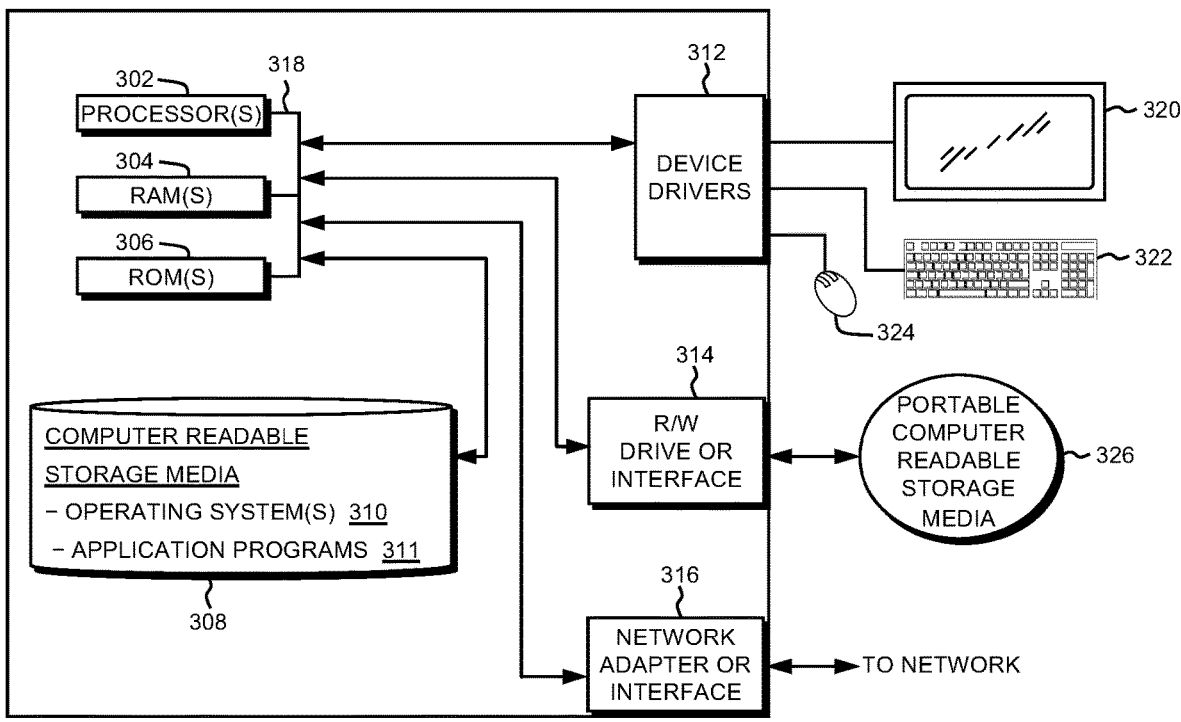
FIG. 3 illustrates a block diagram depicting the hardware components of the resource usage improvement system 100 of FIG. 1, in accordance with an exemplary embodiment of the present inventive concept.
Figure 4:
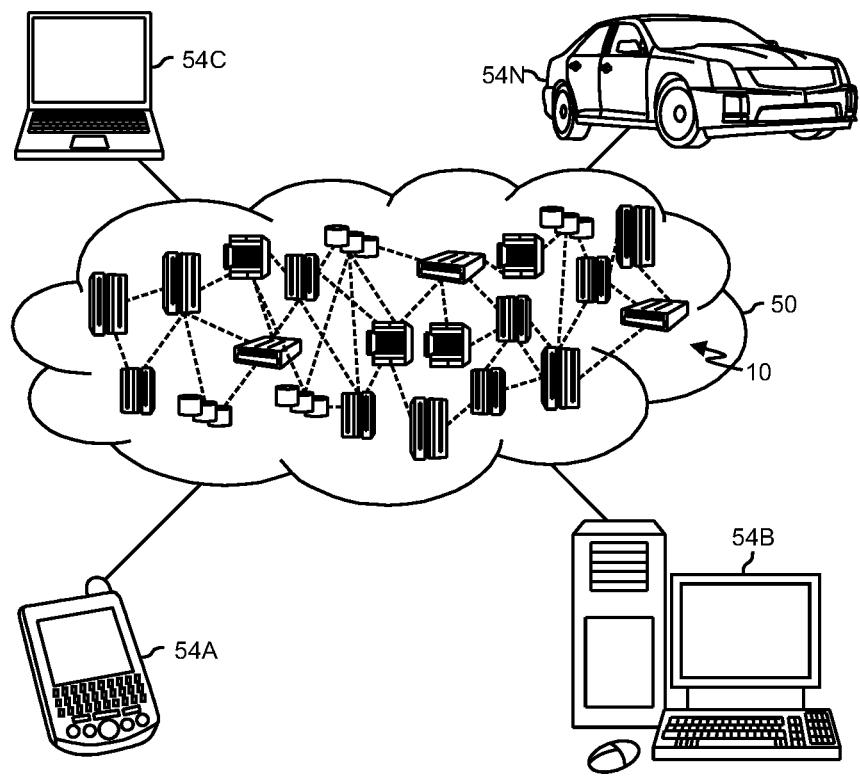
FIG. 4 illustrates a cloud computing environment, in accordance with an exemplary embodiment of the present inventive concept.
Figure 5:
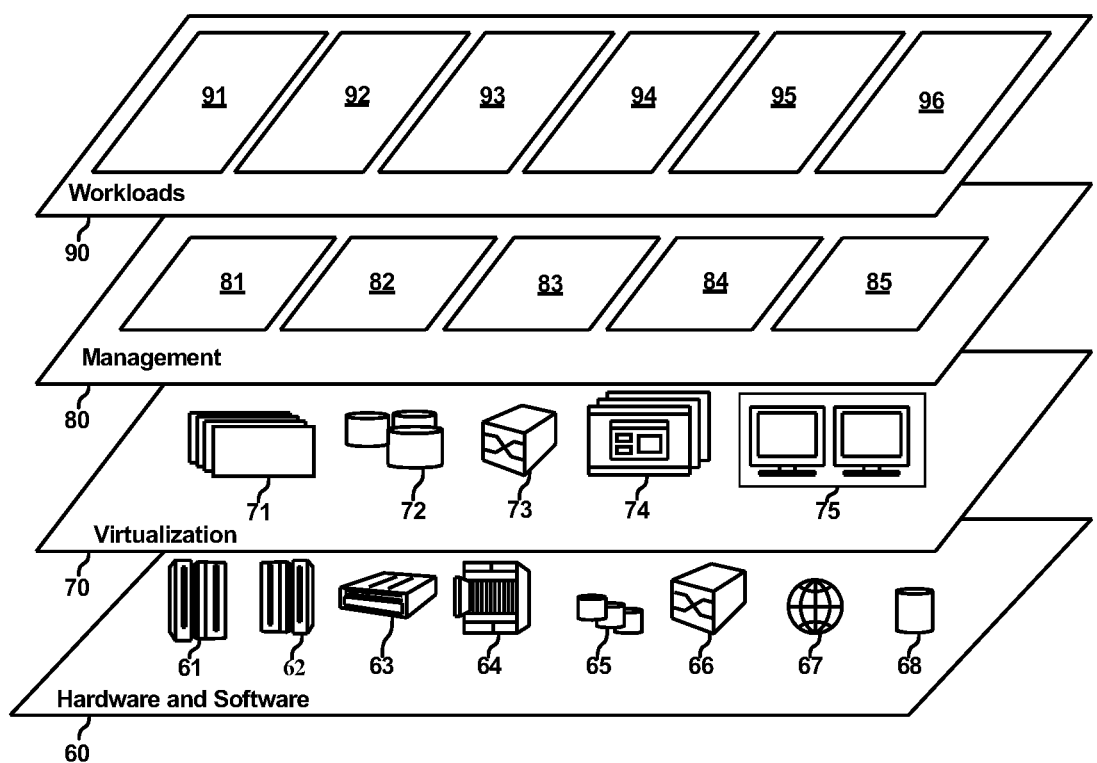
FIG. 5 illustrates abstraction model layers, in accordance with an exemplary embodiment of the present inventive concept.

The computing device 120 is described in greater detail as a hardware implementation with reference to FIG. 3, as part of a cloud implementation with reference to FIG. 4, and/or as utilizing functional abstraction layers for processing with reference to FIG. 5.

The resource usage improvement client 122 may act as a client in a client-server relationship with a server, for example the resource usage improvement server 130. The resource usage improvement client 122 may be a software and/or a hardware application capable of communicating with and providing a user interface for a user to interact with the resource usage improvement server 130 and/or other computing devices via the network 108. Moreover, the resource usage improvement client 122 may be capable of transferring data between the computing device 120 and other computer devices/servers via the network 108. The resource usage improvement client 122 may utilize various wired and wireless connection protocols for data transmission and exchange, including Bluetooth, 2.4 GHz and 5 GHz internet, near-field communication, etc. The resource usage improvement client 122 is described in greater detail with respect to FIGS. 2-5.

The resource usage improvement server 130 may include a resource usage improvement program 134. The resource usage improvement server 130 may act as a server in a client-server relationship with a client, e.g., the resource usage improvement client 122. The resource usage improvement server 130 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices.

Although the resource usage improvement server 130 is shown as a single computing device, the present inventive concept is not limited thereto. For example, the resource usage improvement server 130 may be comprised of a cluster or plurality of computing devices, in a modular manner, etc., working together or working independently.

The resource usage improvement server 130 is described in greater detail as a hardware implementation with reference to FIG. 3, as part of a cloud implementation with reference to FIG. 4, and/or as utilizing functional abstraction layers for processing with reference to FIG. 5.

The resource usage improvement program 134 and/or the resource usage improvement client 122 may be software and/or hardware programs that may collect raw e-conference related data (also referred to herein as raw data) and extract features therefrom. The resource usage improvement program 134 may additionally forecast user e-conference activity and take ameliorative action to optimize e-conference streaming integrity by pre-emptively reallocating computing device resources. The processes of the resource usage improvement program 134 and/or the resource usage improvement client 122 are discussed in further detail with reference to FIGS. 2-5.

Figure 2:
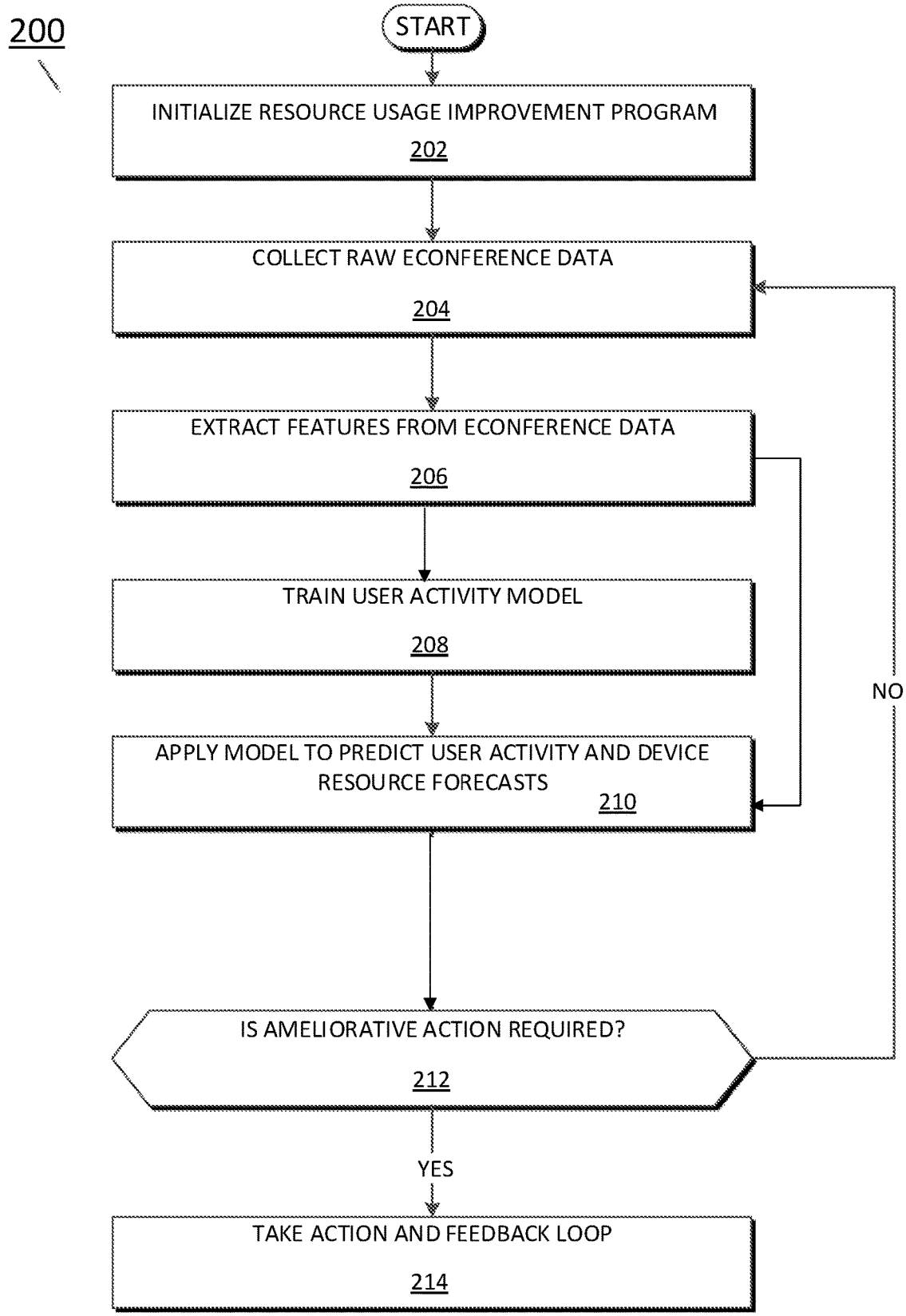
FIG. 2 illustrates a flowchart of real-time analysis 200 depicting the operations of the resource usage improvement program 134, in accordance with an exemplary embodiment of the present inventive concept.

FIG. 2 illustrates a flowchart 200 depicting the operations of the resource usage improvement program 134, in accordance with an exemplary embodiment of the present inventive concept.

A user of the computing device 120 may initialize the resource usage improvement program 134 (step 202) via the resource usage improvement client 122. According to an exemplary embodiment of the present inventive concept, initialization of the resource usage improvement program 134 may include receiving a user login, receiving user consent to collect e-conference related data, and any required configuration, e.g., installing the resource usage improvement program 134 or integrating the resource usage improvement program 134 with an e-conference application.

It should be noted that, at any point, users may opt out of, manage, or change the e-conference related data collection or manner in which their data is used. Furthermore, the resource usage improvement program 134 may be configured to store, use, and transport the user's e-conference related data in accordance with all applicable geographic- and privacy-based data handling protocols.

Upon initialization, the resource usage improvement client 122 may self-configure and detect an e-conference occurring on the user's computing device 120, e.g., via integration. The resource usage improvement client 122 may establish a connection with the resource usage improvement program 134 via the network 108.

According to an exemplary embodiment of the present inventive concept, the resource improvement client 122 may be pre-authorized, in advance of the e-conference, to automatically deploy in conjunction with the e-conference program initialization.

To better illustrate the operations of the resource usage improvement program 134, reference is made to an illustrative example. Here, a user integrates the resource usage improvement program 134 into a work e-conference application for collecting: a stream of an e-conference (video and audio), e-conference activity data (speaking, muting, sharing), a stream of a user (video and audio), a user work schedule (work calendar), and a user's work computing device resource consumption by component.

The resource usage improvement client 122 may collect raw e-conference related data (step 204). The raw data may include spoken conversation, chat text, participant shared e-conference video stream data and multimedia/graphical assets (such as pictures, graphs, diagrams, flowcharts and other non-text assets), video of participants, data obtained from an e-conference activity monitor (e.g., muting/unmuting their microphone, speaking, video sharing, and screen sharing), data obtained by a device resource usage monitor (e.g., computing device 120 fan speed, CPU cycles, and network usage), and participant document corpora provided by the user (e.g., schedules, itineraries, scrum patterns, emails etc.).

Raw e-conference related data may be obtained via an e-conference real-time analysis module, which may be integrated with an e-conference application. Such integration may allow the resource usage improvement program 134 to collect data directly from an e-conference hosting application, e.g., audio and video feeds, chat feeds, uploaded documents, user activity such as speaking, muting, presenting, chatting, etc. The resource usage improvement program 134 may additionally collect data from the computing device 120 via the resource usage improvement client 122, e.g., live stream of the user and resource consumption. The resource usage improvement program 134 may receive access to user itineraries via user input, document upload, document pointer, etc.

Continuing the aforementioned example, the resource usage improvement program 134 may detect that a meeting has begun and collect raw e-conference related data, including e-conference audio and video streams, e-conference user activity, e-conference user live stream, and resource consumption. The resource usage improvement program 134 may additionally reference the user's work calendar to extract e-conference data.

The resource usage improvement program 134 may extract features from the raw e-conference related data (step 206). The features may be extracted using methods such as application of natural language processing/understanding (NLP/NLU) to calendars/itineraries, spoken speech, and written text, application of convolutional neural networks (CNNs) to non-textual graphical assets, extraction of user e-conference activity via integration with an e-conference application, extraction of resource consumption via integration with the computing device 120, and application of recurrent neural networks (RNNs) for extraction of topics. These extracted features may refer to organizing data into topics that help forecast user action and are described with forthcoming greater detail.

The resource improvement program 134 may apply NLU to raw e-conference related data obtained from user provided participant document corpora to extract features from schedules, itineraries, scrum patterns, etc. Such features may include e-conference dates, times, participants, topics, durations, etc., which may be used by the resource usage improvement program 134 in order to proactively prepare for resource consumption demand based thereon. The participant document corpora may provide historic user activity during specific e-conferences, providing data as to which features are present when a user speaks, as well as the ability to cross-reference resource requirements during such e-conferences for additional forecasting accuracy.

Returning to the aforementioned example, the resource usage improvement program 134 may reference the work calendar of the user to extract data indicating that the user has recurring meetings every Monday at LOAM and 3 PM.

The resource usage improvement program 134 may additionally apply NLP to the audio and video streams. Such NLP may include the resource usage improvement program 134 applying speech segmentation and speech recognition to an audio feed of an e-conference. The NLP may additionally include applying optical character recognition and word segmentation (tokenization) to text displayed within multimedia or within a chat window. The resource usage improvement program 134 may additionally extract text from a chat window via integration with an application used for e-conferences. NLP may refer to artificial intelligence facilitated combining of computational linguistics—rule-based modeling of human language—with statistical, machine learning, and deep learning models in order to enable computers to process human language in the form of text or voice data and to 'understand' its full meaning, complete with the speaker or writer's intent and sentiment.

In the example introduced above, the resource usage consumption program 134 extracts text from the LOAM and 3 PM e-conferences that include spoken speech via speech recognition, multimedia text via optical character recognition and word segmentation, and chat text via e-conference application integration. Text extracted from the LOAM meeting relates to income and debt, while text extracted from the 3 PM meeting relates to sales and strategy.

The resource usage improvement program 134 may additionally extract non-textual assets from multimedia displayed during the e-conference, e.g., from the video feed. Multimedia/graphical assets included in the raw e-conference related data may be identified via a CNN that applies pattern matching to classify the video stream data. A CNN (or ConvNet) is a class of artificial neural network, most commonly applied to analyze visual imagery. A CNN may also be known as a shift invariant or space invariant artificial neural networks (SIANN). The CNN may utilize shared-weight architecture of convolution kernels or filters that slide along input features and provide translation equivariant responses known as feature maps.

As used herein, the resource usage improvement program 134 may utilize the CNN in order to discern non-textual assets, e.g., images, videos, charts, graphs, etc., depicted on the monitor of the user during an e-conference. The CNN may identify and classify various patterns and/or shapes corresponding to entities within multimedia, such as people, places, or things. The resource usage improvement program 134 may additionally apply optical character recognition (OCR) in order to identify any text included in graphical assets.

Returning to the aforementioned example, the resource usage improvement program 134 applies a CNN to the video stream of the LOAM and 3 PM e-conferences to classify entities in displayed images, videos, charts, graphs, etc. Via the CNN, the resource usage improvement program 134 classifies displayed pie graphs and graphs throughout the LOAM meeting, while classifying displayed logos and billboards at the 3 PM meeting.

The resource usage improvement program 134 may apply an RNN to the text extracted via NLP and classified graphics extracted via CNN in order to classify e-conference topics. The RNN may classify topics discussed during a given e-conference based on text mining and semantic analysis of the extracted text and graphics.

With reference again to the previously introduced illustrative example, the resource usage improvement program 134 may perform a text mining and semantic analysis of the extracted text and graphics to determine a topic of the LOAM and 3 PM meetings. More specifically, the resource usage improvement program 134 may determine based on text relating to income and debt as well as graphics relating to pie charts and graphs a topic of the LOAM e-conference as budget. Similarly, the resource usage improvement program 134 may determine a topic of the 3 PM e-conference as marketing based on the text relating to sales and strategy as well as graphics relating to logos and billboards.

E-conference participant gestures and facial expressions may also be extracted using a CNN. Such gestures and facial expressions may be utilized by the resource usage improvement program 134 in order to detect when a user may become active in an e-conference. For example, focus or concentration level may be deduced from pupil dilation and blinking patterns. Conversely, lack of a participant focus/concentration, or lack of a participant in the feed, may be indicative of a lack of intent to participate.

In the aforementioned example, the resource usage improvement program 134 may apply a CNN to the video feed of the user in order to determine a high focus level during the LOAM budget e-conference and a low focus level during the 3 PM marketing e-conference.

The resource usage improvement program 134 may additionally extract user activity from the e-conference via integration with an e-conference application. Such activity may include times at which the user speaks, times at which the user mutes, times at which the user shares, times at which the user chats, and the like.

With reference again to the aforementioned example, the resource usage improvement program 134 may extract via integration with the work e-conference application features indicating that the user speaks and shares for an entirety of the recurring LOAM meeting, while staying on mute without sharing for the entirety of the 3 PM meeting.

The resource usage improvement program 134 may further extract resource consumption of a computing device of the user during an e-conference. The resource consumption may be extracted via communication with an operating system of the computing device, i.e., the computing device 120. Such resource consumption features may relate to components such as CPU, GPU, memory, fan/cooling, network, etc., and may be absolute, percentile, etc. measurements.

Returning to the example introduced above, the resource usage improvement program 134 may extract resource consumption of the computing device of the user during the LOAM and 3 PM e-conference. Specifically, the resource usage improvement program 134 may note a high CPU, fan, and network usage during the LOAM meeting in which the user is sharing and speaking. Conversely, the resource usage improvement program 134 may note low CPU, fan, and network usage during the 3 PM meeting in which the user does not speak nor share.

The features extracted above may all be stored in a personalized profile within the e-conference correlated user activity repository such that user patterns may be tracked and modified. Namely, the CNN and NLP classified topics, NLU extracted features, the user's activity during the e-conference, facial expressions and gestures of participants, and the device resource usage (e.g., fan speed, CPU cycles, and network bandwidth) may all be captured in the e-conference correlated user activity repository 132.

The resource usage improvement program 134 may train a user activity model (step 208). The user activity model may correlate the features extracted above, and more specifically correlate an impact a particular input feature has on a model output. The resource usage improvement program 134 may determine this correlation through training in which machine learning, e.g., an RNN, is used to train the user activity model to output a known output based on one or more input features, where the closer the output to the known output, the more accurate the model.

According to an exemplary embodiment of the present inventive concept, the resource usage improvement program 134 may train the user activity model to correlate the classified topic with the user activity and resource consumption such that user activity and resource consumption may be predicted based on an input topic. In such embodiments, the resource usage improvement program 134 may train the user activity model with historic data in which the topic, user activity, and resource consumption are known, and the training may identify the relationship between the input topic and output user activity and resource consumption. Once trained, the user activity model may then output, i.e., predict, user activity and resource consumption based on any given topic input, and more specifically the topic identified by the RNN above. In addition, the resource usage improvement program 134 may further receive as input into the user activity model the itinerary of the user, from which topics may be extracted or deduced based on time, date, participants, etc. For instance, the resource usage improvement program 134 may identify topics that have commonly occurring participants, documents, and e-conference times.

Returning again to the aforementioned example, the resource usage improvement program 134 may correlate the topic of budget and the itinerary data indicating an e-conference time of LOAM in a particular group of participants with the user activities of speaking and sharing as well as the resource consumption of high CPU, fan, and bandwidth demand. In addition, the resource usage improvement program 134 may correlate the topic of marketing and the itinerary data indicating an e-conference time of 3 PM in another particular group of participants with the user activities of muting and not sharing as well as the resource consumption of low CPU, fan, and bandwidth demand.

According to an exemplary embodiment of the present inventive concept, a RNN may apply a predetermined/previously trained user activity model to classified e-conference topics, other extracted features, device resource usage data, and user activity/usage data to generate a user activity forecast and a device resource forecast.

The resource usage improvement program 134 may apply the user activity model (step 210). In an exemplary embodiment of the present inventive concept, the resource usage improvement program 134 may determine a topic of an e-conference as described above and, based on inputting the topic into the user activity model, receive as output a score indicative of imminent user activity and corresponding resource consumption. In embodiments, the resource usage improvement program 134 may deduce a topic from a date, time, topic, participants, etc. extracted from the itinerary of the user. For instance, the topic of an e-conference may be denoted in a meeting invitation or deduced based on historic data indicating that a date, time, participants, etc. correlate strongly with a particular topic.

Based on application of the model, the resource usage improvement program 134 may receive as output from the user activity model a user activity forecast score indicative of user activity, e.g., the higher the score the higher the likelihood of activity. Moreover, the user forecast model may further output such likelihoods with respect to different types of user activity such that the outputs include a separate likelihood for user speaking, sharing, etc. Such instrumentality may allow the user activity model to further take advantage of the resource consumptions associated with such user activities and prepare the computer device 120 of the user accordingly, as will be further described.

With continued reference to the previously introduced example, the resource usage improvement program 134 may detect that the user has entered an e-conference and determine that the topic of the conference is budget. Based on inputting the topic of budget into the user activity model, the resource usage improvement program 134 may output a high likelihood of sharing and speaking by the user. Similarly, when the topic of the 3 PM meeting is determined to be marketing, application of the user activity model may output a low likelihood of user sharing or speaking. Further note that application of the user activity model may be performed in advance of an e-conference if a topic can be deduced using data extracted from the itinerary of the user, allowing for even more advanced resource allocation preparations.

Based upon the user activity forecast and the device resource usage forecast, the resource usage improvement program 134 may determine if ameliorative resource action is required (decision 212). The resource usage improvement program 134 may determine whether ameliorative action is required based on the user activity forecast scores, e.g., by comparing them to one or more thresholds. Such thresholds may be determined based on resource consumption known to trigger actions detrimental to e-conference integrity. For instance, fan noise audible to a microphone may be triggered at a specific CPU load, at which the threshold for ameliorative action may be set. Similarly, lack of network bandwidth resulting in lesser framerates may occur during screen sharing of a video, which again may be reflected by the threshold at which ameliorative action may be set. Based on any of the user activity forecast scores exceeding the predefined thresholds, the resource usage improvement program 134 may identify the need for ameliorative action thereof.

In the example above, the resource usage improvement program 134 compares the user activity forecast scores to the thresholds in place indicating when ameliorative action is needed for both the LOAM and 3 PM meetings of the user, where the LOAM meeting is found to require ameliorative action while the 3 PM meeting is found not to require ameliorative action.

If ameliorative resource action is not required (decision 212, "NO" branch), the resource usage improvement program 134 may collect raw e-conference data (step 204). If, however, ameliorative resource action is required (decision 212, "YES" branch), the RNN may take action and perform a feedback loop (step 214). Ameliorative action selected may depend on the predicted user action. For example, ameliorative action for high fan noise may include completing background processing and/or background network activity, performing system cooling ahead of the predicted needs of the video e-conferencing application (pre-running fan), etc. In addition, ameliorative action for poor streaming quality may require switching from a tunneled to a non-tunneled VPN, prompting a user to join phone based audio when network performance is not adequate for IP based audio, dynamically pausing/reducing background processing and/or network activity, etc.

The resource usage improvement program 134 may then observe the results of the ameliorative action to determine an effectiveness of such actions. For instance, the resource usage improvement program 134 may ensure fan noise is reduced in the microphone feed of the user after having pre-cooled the system, or ensure the streaming video is smooth after pausing other network activities of the computing device 120. The resource usage improvement program 134 may then compare the actual result observed above to the intended result of amelioration to determine an effectiveness of the user activity model. The resource usage improvement program 134 may then utilize the effectiveness in adjusting the user activity model and weights. For instance, if the results are not very accurate, weights applied to features and/or modified thresholds at which ameliorative action is taken may be fine-tuned, and/or the ameliorative action may be modified.

Concluding the aforementioned example, the resource usage improvement program 134 may, based on determining that fan noise need be reduced, cool the system prior to the LOAM meeting of the user such that the increased heat of the LOAM meeting doesn't warrant excessive fan usage, then monitor the results of such actions through monitoring the microphone of the user and/or fan speeds. The resource usage improvement program 134 may then adjust models and thresholds as needed.

Thus, device resource usage encumbrances associated with forecasted user activity (such as before the user presents in the e-conference) may be avoided by pre-emptive ameliorative resource action taken.

FIG. 3 illustrates a block diagram depicting the hardware components of the resource usage improvement system 100 of FIG. 1, in accordance with an exemplary embodiment of the present inventive concept.

It should be appreciated that FIG. 3 provides only an illustration of one implementation and does not imply any limitations with regard to the environments in which different embodiments may be implemented. Many modifications to the depicted environment may be made.

Devices used herein may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

One or more operating systems 310, and one or more application programs 311 are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 314 to read from and write to one or more portable computer readable storage media 326. Application programs 311 on said devices may be stored on one or more of the portable computer readable storage media 326, read via the respective R/W drive or interface 314 and loaded into the respective computer readable storage media 308.

Devices used herein may also include a network adapter or interface 316, such as a TCP/IP adapter card or wireless communication adapter (such as a 4G wireless communication adapter using OFDMA technology). Application programs 311 on said computing devices may be downloaded to the computing device from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Devices used herein may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

It is to be understood that although this disclosure includes a detailed description on cloud computing, implementation of the teachings recited herein are not limited to a cloud computing environment. Rather, the exemplary embodiments of the present inventive concept are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 illustrates a cloud computing environment, in accordance with an exemplary embodiment of the present inventive concept.

As shown, cloud computing environment 50 may include one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

FIG. 5 illustrates abstraction model layers, in accordance with an exemplary embodiment of the present inventive concept.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive assessment processing 96.

The exemplary embodiments of the present inventive concept may be a system, a method, and/or a computer program product at any possible technical detail level of integration. The computer program product may include a computer readable storage medium (or media) having computer readable program instructions thereon for causing a processor to carry out aspects of the present inventive concept.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present inventive concept may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present inventive concept.

Aspects of the present inventive concept are described herein with reference to flowchart illustrations and/or block diagrams of methods, apparatus (systems), and computer program products according to exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present inventive concept. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

The invention claimed is:

1. A method for enacting an ameliorative resource action during an e-conference, the method comprising:
collecting data from a user's computer device during the e-conference;
extracting features from the collected e-conference data;
forecasting a user's participation within the e-conference and a resource consumption thereof by applying a user activity model to the extracted features; and
enacting the ameliorative resource action based upon the forecasted user's participation and the resource consumption thereof,
wherein the collected data is selected from a group consisting of e-conference audio feed, e-conference video feed, e-conference activity of the user, an itinerary of the user, and resource consumption of a computing device associated with the user,
wherein the extracted features include a topic of the e-conference, a user activity during the e-conference, a resource consumption during the e-conference, and an itinerary corresponding to the user, and
wherein the extracting features from the collected e-conference data further comprises:
applying natural language processing to spoken speech of the e-conference audio feed and written text of the e-conference video feed;
applying a convolutional neural network to graphics within the e-conference video feed; and
extracting the topic corresponding to the e-conference based on an output of the natural language processing and the convolutional neural network.

2. The method of claim 1, wherein the model correlates the topic with the forecasted user's participation and the resource consumption thereof.

3. The method of claim 1, wherein the ameliorative resource action is selected from a group consisting of completing background processing, completing background network activity, pre-running a cooling fan, switching from a tunneled to a non-tunneled VPN, prompting a user to join phone based audio when network performance is not adequate for IP based audio, dynamically pausing or reducing background processing and/or network activity.

4. The method of claim 1, further comprising:
determining an accuracy of the forecasted user's participation and the resource consumption thereof; and
adjusting the user activity model based on the determined accuracy.

5. A computer program product for enacting an ameliorative resource action during an e-conference, the computer program comprising:
one or more computer-readable storage media and program instructions stored on the one or more computer-readable storage media, the program instructions including a method, the method comprising:
collecting data from a user's computer device during the e-conference;
extracting features from the collected e-conference data;
forecasting a user's participation within the e-conference and a resource consumption thereof by applying a user activity model to the extracted features; and
enacting the ameliorative resource action based upon the forecasted user's participation and the resource consumption thereof,
wherein the collected data is selected from a group consisting of e-conference audio feed, e-conference video feed, e-conference activity of the user, an itinerary of the user, and resource consumption of a computing device associated with the user,
wherein the extracted features include a topic of the e-conference, a user activity during the e-conference, a resource consumption during the e-conference, and an itinerary corresponding to the user, and
wherein the extracting features from the collected e-conference data further comprises:
applying natural language processing to spoken speech of the e-conference audio feed and written text of the e-conference video feed;
applying a convolutional neural network to graphics within the e-conference video feed; and
extracting the topic corresponding to the e-conference based on an output of the natural language processing and the convolutional neural network.

6. The method of claim 5, wherein the model correlates the topic with the forecasted user's participation and the resource consumption thereof.

7. The method of claim 5, wherein the ameliorative resource action is selected from a group consisting of completing background processing, completing background network activity, pre-running a cooling fan, switching from a tunneled to a non-tunneled VPN, prompting a user to join phone based audio when network performance is not adequate for IP based audio, dynamically pausing or reducing background processing and/or network activity.

8. The method of claim 5, further comprising:
determining an accuracy of the forecasted user's participation and the resource consumption thereof; and
adjusting the user activity model based on the determined accuracy.

9. A computer system for enacting an ameliorative resource action during an e-conference, the system comprising:
one or more computer processors, one or more computer-readable storage media, and program instructions stored on the one or more of the computer-readable storage media for execution by at least one of the one or more processors, the program instructions including a method comprising:
collecting data from a user's computer device during the e-conference;
extracting features from the collected e-conference data;
forecasting a user's participation within the e-conference and a resource consumption thereof by applying a user activity model to the extracted features; and
enacting the ameliorative resource action based upon the forecasted user's participation and the resource consumption thereof,
wherein the collected data is selected from a group consisting of e-conference audio feed, e-conference video feed, e-conference activity of the user, an itinerary of the user, and resource consumption of a computing device associated with the user,
wherein the extracted features include a topic of the e-conference, a user activity during the e-conference, a resource consumption during the e-conference, and an itinerary corresponding to the user,
wherein the extracting features from the collected e-conference data further comprises:
applying natural language processing to spoken speech of the e-conference audio feed and written text of the e-conference video feed;
applying a convolutional neural network to graphics within the e-conference video feed; and extracting the topic corresponding to the e-conference based on an output of the natural language processing and the convolutional neural network.

10. The method of claim 9, wherein the model correlates the topic with the forecasted user's participation and the resource consumption thereof.

11. The method of claim 9, wherein the ameliorative resource action is selected from a group consisting of completing background processing, completing background network activity, pre-running a cooling fan, switching from a tunneled to a non-tunneled VPN, prompting a user to join phone based audio when network performance is not adequate for IP based audio, dynamically pausing or reducing background processing and/or network activity.

\* \* \* \* \*